Oct. 20, 1964  S. H. STEKETEE  3,153,262
BOTTOM EJECTING MOLDING PRESS
Filed Jan. 2, 1962  3 Sheets-Sheet 1
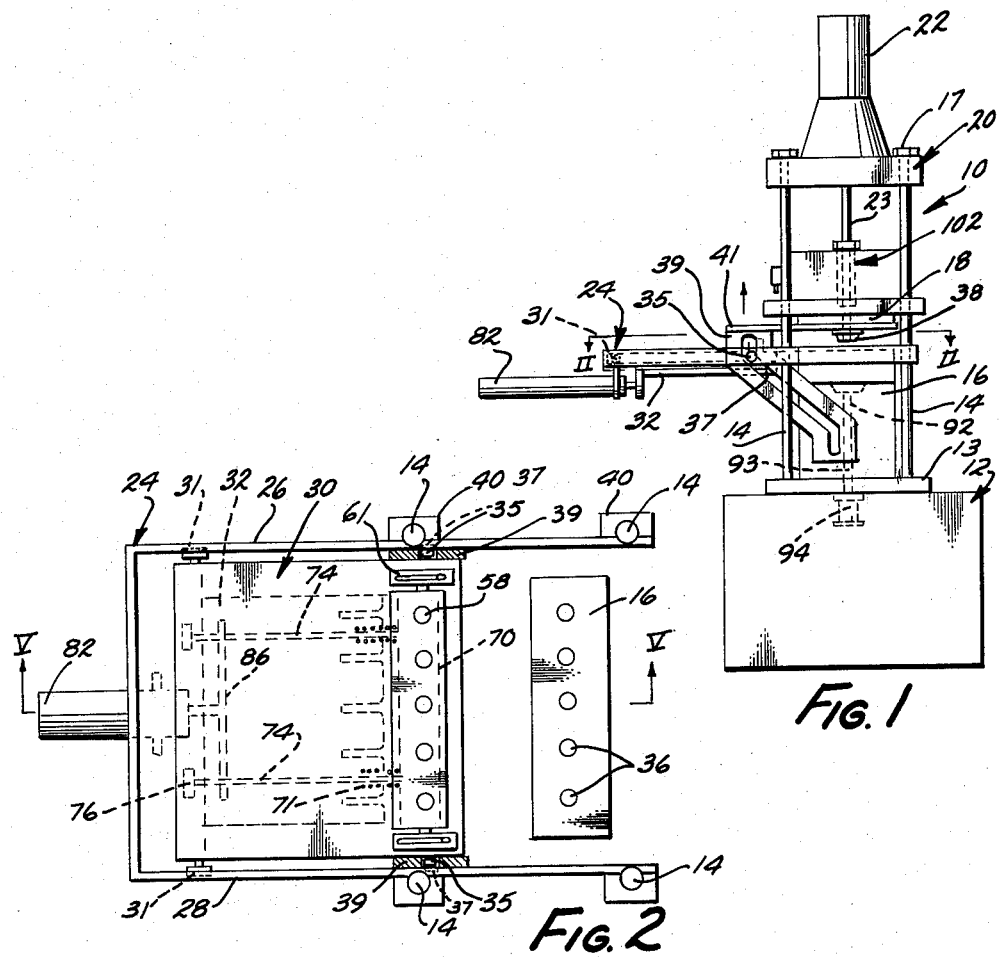
FIG. 1
FIG. 2
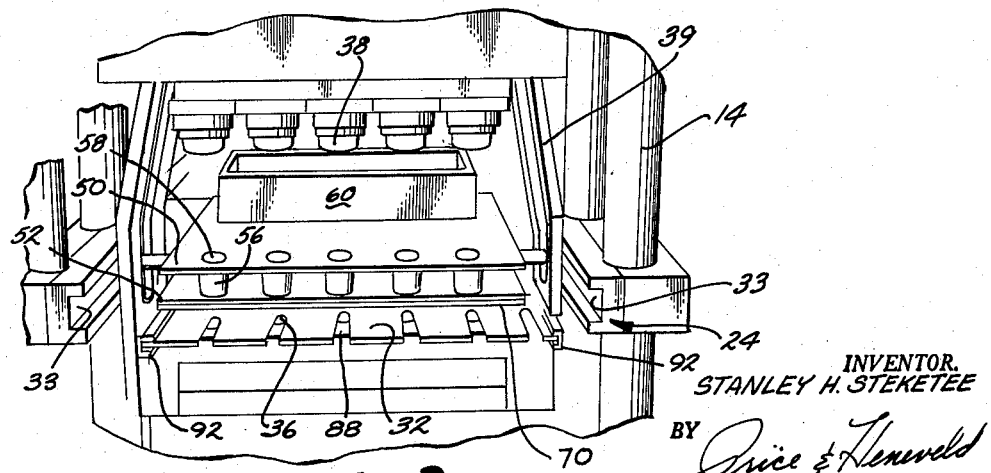
FIG. 3
INVENTOR.
STANLEY H. STEKETEE
BY Price & Heneveld
ATTORNEYS

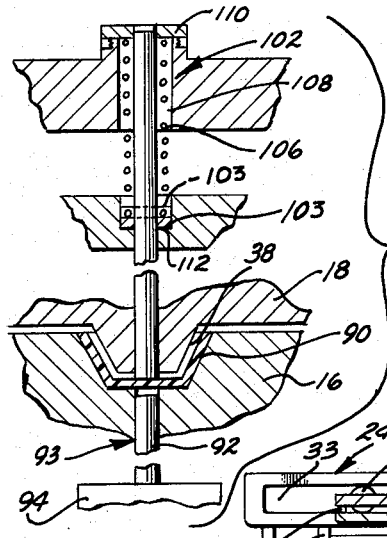
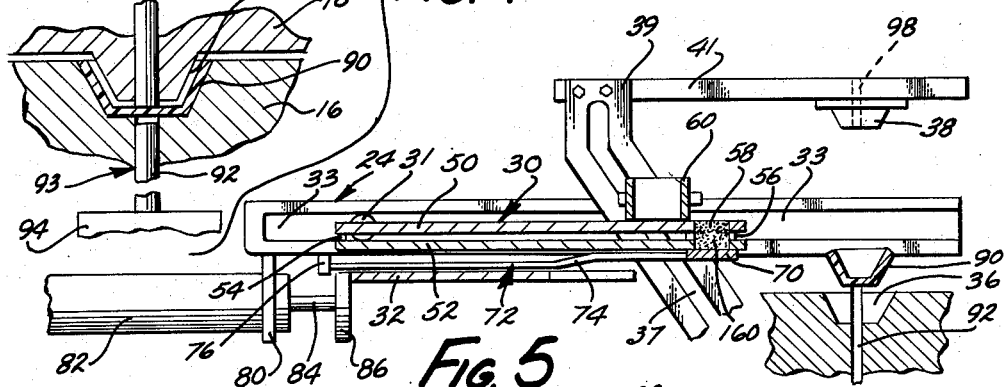
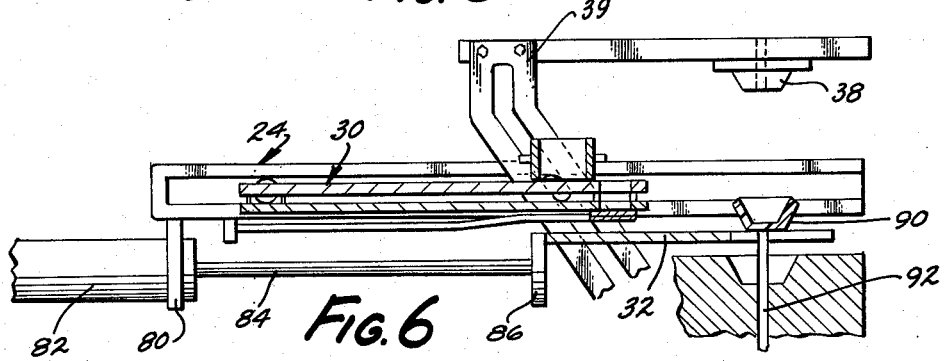
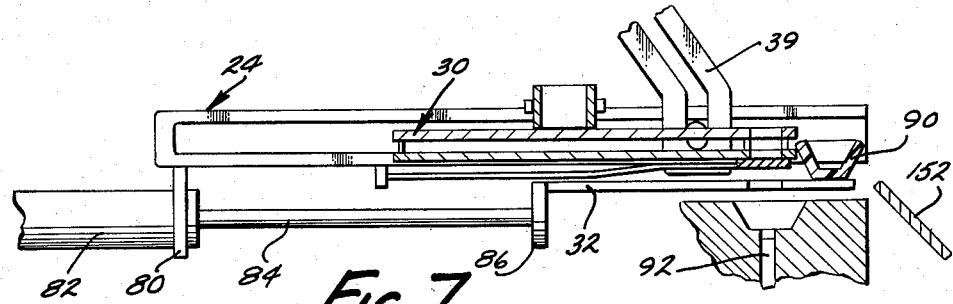

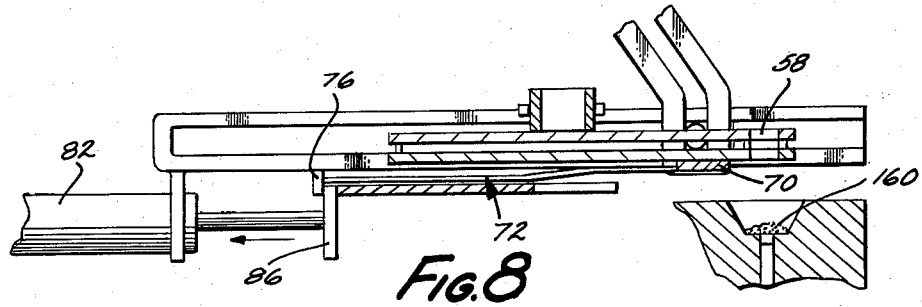
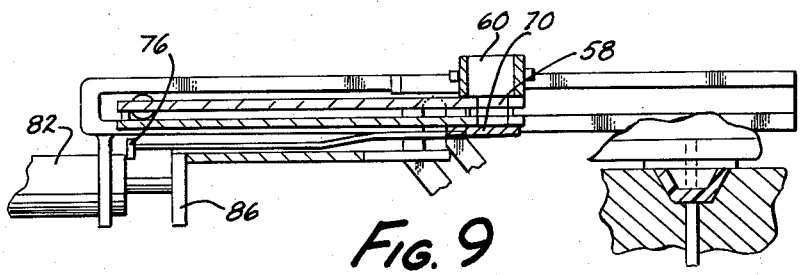
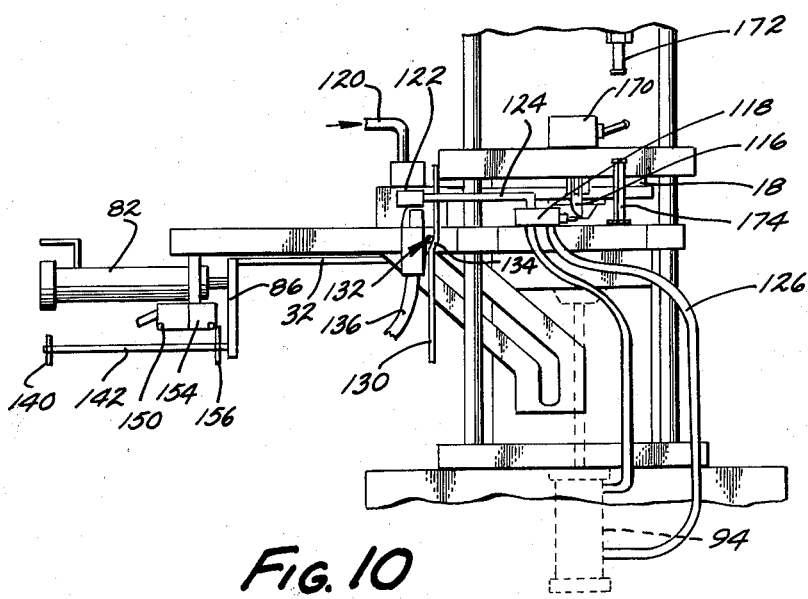

United States Patent Office 3,153,262
Patented Oct. 20, 1964

3,153,262
BOTTOM EJECTING MOLDING PRESS
Stanley H. Steketee, Holland, Mich., assignor to Dake Corporation, Grand Haven, Mich., a corporation of Michigan
Filed Jan. 2, 1962, Ser. No. 163,621
9 Claims. (Cl. 18—16)

This invention relates to molding apparatus, and more particularly to a bottom-ejection molding press for forming molded articles from particulate plastic materials.

In the mass production of molded plastic articles from particulate molding materials, it is extremely desirable from an economical standpoint to achieve a high rate of article production per unit of time, and further, to realize this high rate on a machine adaptable to complete automation, thereby enabling rapid, continued 24-hour operation without attention. A common method of achieving greater speeds in conventional molding equipment is to accelerate the components thereof, and/or to add more components to supplement those already used. Such "solutions" to achieve less expensive molded articles are often more apparent than real, however, since with the sacrifice of simplicity and with the acceleration of component movements to achieve speed, dependability is reduced, thereby causing larger maintenance costs and increasing the likelihood of unproductive downtime in unattended automatic machines. The added mechanism also raises initial equipment cost considerably.

Thus, simplicity is ordinarily difficult if not impossible to achieve when increasing speed in automatic molding machines since there are certain operations that must be performed. More specifically, after the press is opened; the molded articles must be removed out of the cavities, taken away from the cavities, and discharged; the fresh molding material must be transported between the upper and lower platens, and discharged into the individual mold cavities; and then the mechanisms used to remove the molded articles and to discharge them, and used to feed the fresh molded material and discharge it in the cavities, must all be retracted out of the press before it is again closed to cure the next batch. As is well-known in the art, this time lapse between the curing cycles means lost time and money from a production standpoint, as well as lost heat from the molding surfaces.

It is therefore an object of this invention to provide a unique molding apparatus capable of operating and molding articles at a high rate of speed. The increased rate is obtained without a corresponding decrease in dependability since the apparatus comprises a simplified structure utilizing components having dual functions. The simple construction enables dependable operation, even at full automation, and lower equipment costs, as well as a lower molded article cost per unit.

It is a further object of this invention to provide a novel molding apparatus wherein elements or components thereof perform a dual function simultaneously and sequentially, in a dependable rapid manner to thereby reduce the time lapse between curing cycles. These and other objects will be apparent from studying the following specification in conjunction with the drawings, in which:

FIG. 1 is a side elevational view of the novel molding apparatus;

FIG. 2 is a top sectional view taken on plane II—II of the structure illustrated in FIG. 1;

FIG. 3 is a front fragmentary perspective view of the molding apparatus in FIG. 1;

FIG. 4 is a fragmentary sectional view of the molded article being stripped from the upper molding surface as the upper platen begins to move away from the lower platen;

FIG. 5 is a fragmentary sectional elevational view taken on plane V—V of the structure illustrated in FIG. 2 and depicting the components of the apparatus when the press is partially opened and the molded articles are being ejected;

FIG. 6 is a fragmentary sectional view of the apparatus in FIG. 3 showing the comb extended to support the ejected articles;

FIG. 7 is a sectional view illustrating the apparatus in FIG. 5 and showing the tray means extended between the platens to both knock the molded articles off the comb and also to transport fresh molding material to a position above the molding cavities;

FIG. 8 is a sectional view illustrating the apparatus in FIG. 5 and showing the comb retracted to trigger the discharge of the fresh molding material;

FIG. 9 is a sectional fragmentary view of the apparatus illustrated in FIG. 5 showing the mold closed and the tray and comb retracted; and FIG. 10 is a fragmentary side elevational view of the apparatus illustrated in FIG. 1 showing typical control valves, switches, and cams to govern the sequential movements.

Basically, the inventive molding apparatus comprises a lower die plate including a plurality of die cavities; an upper force plate reciprocable toward and away from the lower die plate and having a plurality of molding surfaces cooperable with the mold cavities; a tray means movable between the plates, preferably by a cammed coaction with the reciprocating force plate; and a comb positioned generally under and adjacent the tray and movable independently thereof. The tray comprises both a transporting means for the new particulate molding material to the die cavities, and also an article knock-off means to bump molded articles supported on the comb out of the molding structure. The comb comprises both a supporting means for molded articles ejected from the mold cavities and an actuating means for a trap door on the feed tray to discharge molding material into the mold cavities.

Referring now to FIG. 1, the molding apparatus 10 includes a press having a base portion 12, upright support means 14 secured to the base, and cross head portion 20 mounted on the upright supports in a conventional manner.

The base includes a platform 13 to which four cylindrical supporting and guide posts 14 are secured. Cross head 20 is fixedly attached to posts 14 as by nuts 17, and has mounted thereon a fluid power cylinder 22. Extending downwardly from cylinder 22 is piston 23 secured to upper platen 18 to reciprocate the platen or force plate upwardly away from and downwardly toward lower platen or die plate 16. The fluid cylinder may be supplemented by a conventional toggle mechanism if desired (not shown).

A plurality of die cavities 36 are provided in the lower platen to cooperate with a plurality of male molding surfaces 38 on the force plate 18. One row of such cavities and surfaces are here shown for convenience, but it will be obvious from a study of the description hereinafter that more rows may be utilized.

Mounted to posts 14 by a suitable set of clamps 40 is a generally U-shaped guide means 24 including parallel legs 26 and 28 each having a guide track 33. Rollably disposed in tracks 33 are rear rollers 31 of tray 30. This tray is composed of upper and lower plates 50 and 52 joined by spacer 54 at the rear, and joined by a plurality of cylindrical tubular elements 56 at the front. Openings in plates 50 and 52 complement tubular spacers 56 to form a plurality of molding material receiving and retaining chambers 58. Chambers 58 are refilled by a molding material storage box 60 mounted by brackets 61 to stationary guide 24, and positioned in sliding contact with the top surface of tray 30.

Front rollers 35 on tray 30 ride in slot 37 of cam track 39. The cam track is affixed to laterally extending support 41 on upper platen 18. Rollers 31 thus act as a cam follower means in the diagonal cam track. Also on the same axle as rollers 35 are rollers 39 which ride in track 33 to maintain the feed tray in a horizontal plane.

Attached under guide 24 is a supporting flange 80 to which fluid power cylinder 82 is mounted. Piston shaft 84 of this cylinder is secured at its extended end to leg 86 of comb 32. The comb includes a plurality of teeth and intermittent slots 88 on its forward end, the slots being aligned with mold cavities 36. Comb 32 is reciprocably slidable in a pair of suitable channel guides 92 (FIG. 3).

Immediately above comb 32 and mounted slidably to the underside of tray 32 is a trap door 70 to close the bottom of chambers 58. Extending from trap door 70 is a trigger means 72 including a pair of rods 74, and a pair of bumpers 76. Compression springs 71 mounted between door 70 and plate 52 around the rods bias the trap door to its closed position. Leg 86 of comb 32 is operatively associated with bumpers 76 to open door 70 in a manner to be explained hereinafter.

Associated with force plate 18 and molding surface 38 is an article stripper mechanism 102. Associated with the lower die plate 16 is an ejection pin mechanism 93, both to be explained more fully hereinafter.

The several steps in the molding process are illustrated in FIGS. 4 through 9. FIG. 4 shows the male molding surface just breaking away from the molding cavity. Stripping mechanism 102 assures removal of article 90 from surface 38. The mechanism comprises hold-down rod 98, collar 104 affixed to rod 98, and compression spring 106 in opening 108. Rod 98 is secured to collar 103 and is guided through spring retainer 110.

When the press is closed, rod 98 is approximately flush with the bottom of force 38. As the press opens, force 38 rises. However, rod 98 is held down by the spring 106, thus stripping the part from force 38. Further raising of the platen causes rod 98 to be lifted in the extended position along with force 38 since collar 103 abuts surface 112.

As the press opens still further, i.e., upper platen raises further, cam element 116, mounted on the upper platen 18 (FIG. 10), allows air control valve 118 to shift and open. Solenoid valve 122 is normally open during operation and is controlled by an additional switch (not shown). Thus, pressurized air passing from feed line 120 through the solenoid valve 122 and through conduit 124 can pass through valve 118, and through line 126 to actuate power cylinder 94. Cylinder 94 actuates the ejection pins 92 upwardly (FIG. 5) to eject the molded articles 90 from the mold cavities.

When the press has opened only part-way, cam bar 130 attached at its upper end to platen 18, depresses valve 132 due to the offset 134 in the bar. This causes pressurized fluid in line 136 to shut off the fluid pressure to prime mover cylinder 22 which is raising the upper platen. The platen is stopped thereby in the half-open position. This is necessary for proper operation of the novel combination since it allows room for article ejection but does not cam the tray in all the way as yet. At this position the tray 30 has been cammed only partly into the press by rollers 35 following the diagonal slot 37 as the cam track raises with the upper platen.

When cylinder 94 shifts bottom ejection bar 92 upwardly to eject the molded article, the rising bar cams a limit switch (not shown) to actuate power cylinder 82. This extends comb 32 between the platens (FIG. 6) with the limit switch actuation assuring opening of the press before extension of the comb. Slots 88 straddle ejection pins 92 under articles 90. Extension of comb 32 moves collar 140 and rod 142 attached to the extended end of leg 86 of the comb (FIGS. 6 and 10). Collar 140 shifts limit switch 150 which causes power cylinder 94 to retract and thereby withdraw ejection rods 92. Articles 90 thus rest on comb 32. This switch also causes the reactuation of cylinder 22 to raise the upper platen the rest of the way.

As the platen raises, cam track 39 moves tray 30 further into the press (FIG. 7). Since the tray is above and adjacent comb 32, the front edge of the tray or an extension thereof then knocks the molded articles 90 off the comb and out of the press where they slide down a suitable chute 152. When the tray reaches its maximum inserted position, the upper platen reaches its uppermost position where switch 170 abuts stop 172 causing actuation of cylinder 82 to retract comb 32. (Switch 170 may later be reset when the force plate is again lowered due to the presence of a lower stop 174.)

As the comb withdraws, the back surface of leg 86 on the comb abuts bumper 76 of the trap door trigger means 72. Opening of the trap door allows discharge of fresh molding material 160 from the tray chambers 58 to the mold cavities 36. When the comb is completely retracted, rod 142 has been moved with the extended leg 86 of the comb. Collar 156 on rod 142 thus abuts limit switch 154 which is backed up against limit switch 150. With this, cylinder 22 is actuated to again lower the upper force plate (FIG. 9) to form and cure another set of articles. Downward movement of the upper platen causes tray 32 to retract as it follows lowering diagonal cam track 39. Bumper 76 moves away from leg 86 to allow springs 71 (FIG. 2) to shift trap door 70 under the chambers 58 again. Complete retraction of tray 32 also causes chambers 58 to be under storage box 60 where they refill for the next group of articles.

It will of course be evident that the sequential operations may be controlled manually. Alternatively, the control valves may all be operated by switches and camming devices as described. Various types of control switching may obviously be employed according to conventional principles. The switching elements described above are merely illustrative.

Various minor modifications of the form of the invention illustrated may occur to those in the art upon reading the foregoing description. All such modifications within the inventive principles taught are intended to be part of this invention, which is to be limited only by the scope of the appended claims and the reasonably equivalent structures thereto.

I claim:

1. In a molding apparatus comprising a lower die plate including molding cavities therein and an upper die plate movable vertically toward and away from said lower die plate and having cooperating molding surfaces thereon; reciprocable support means for supporting ejected molded articles above said cavities; tray means movable between said die plates to transport fresh molding material to said cavities; said support means including a support plate on the same side of said molding apparatus as said tray means, and movable into said press generally beneath said tray means out of contact therewith under the molded articles for temporary support thereof; and said tray means also comprising an article knock-off means movable over the top surface of said plate when moving between said plates, and having a front bumper surface capable of pushing molded articles off said support plate and out of said molding apparatus prior to discharge of said molding material into said cavities.

2. The apparatus defined in claim 1 wherein said support plate comprises a comb positioned generally under and adjacent said tray, on the same side of said molding apparatus as said tray means, separate motive means is operably associated with said comb for moving said comb independently of said tray means between and out from between said plates.

3. The apparatus as defined in claim 2 wherein said comb is operably associated with said tray to trigger the discharge of said materials upon being retracted beneath said tray means from between said plates.

4. In a molding apparatus comprising a lower die plate having mold cavities therein, and an upper force plate movable toward and away from said lowered plate and having cooperating molding surfaces thereon for forming molded articles therebetween; article ejection means for moving molded articles out of said cavities; reciprocable comb means on one side of said apparatus including motor means for movement between said plates to temporarily support ejected molded articles above said cavities and allow removal of said articles from said apparatus; tray means above said comb means and on the same side of said apparatus, and movable between said die plate and said force plate to transport fresh particulate molding material to said cavities; said tray means including chamber means for receiving said molding materials and a shiftable bottom portion to allow discharge of said molding material from said chamber means into said cavities; trigger means for said shiftable bottom portion; and said comb means being operably associated with said trigger means to cause shifting of said bottom portion and thus discharge of said molding material as said comb is retracted beneath said tray means from between said plates.

5. Molding apparatus comprising: a lower platen including molding cavities; an upper platen having molding surfaces thereon cooperable with said cavities to form a plurality of molded articles therebetween; said upper platen and lower platen being reciprocally movable toward and away from each other; reciprocable comb means movable between said platens when the latter are moved apart from each other to support molded articles ejected from said cavities; and a combination feed tray and molded article knock-off means above said comb means and reciprocably movable over the support surface of said comb to first push said articles off said comb and out of said molding apparatus, and to simultaneously transport fresh particulate molding material to said cavities for forming the next plurality of articles.

6. Molding apparatus comprising: a lower platen including molding cavities; an upper platen having molding surfaces thereon cooperable with said cavities to form a plurality of said molded articles therebetween; said upper platen and lower platen being reciprocally movable toward and away from each other; reciprocable comb means movable between said platen when the latter are moved apart from each other to support ejected molded articles; a combination feed tray and molded article knock-off means reciprocably movable over the upper surface of said comb to push said articles off said comb and out of said molding apparatus, and to simultaneously transport fresh particulate molding materials to said cavities for forming the next plurality of articles; said feed tray having motive means; said comb having motive means independent of said feed tray motive means; said comb being operative to retract from between said platens after said articles are removed therefrom; trap door means on said feed tray to allow discharge of said materials into said cavities, and said trap door means being operably engaged by said comb means when said comb means is retracted to actuate said door by said comb to discharge said materials into said cavities with retraction of said comb out of said molding apparatus.

7. Molding apparatus comprising a lower platen having molding cavities therein; an upper reciprocable platen having molding surfaces thereon cooperable with said molding cavities and movable toward and away from said lower platen; cam track means connected to said reciprocable upper mold; a combination feed-transporting and molded article discharging tray; cam follower means on said tray cooperating with said cam track means to cause said tray to be moved between said platens when the upper platen moves away from said lower platen, and to be retracted from between said platens as the upper platen moves toward the lower platen; a comb disposed beneath said tray on the same side of said apparatus as said tray and reciprocable between said platens; independent power motor means operatively associated with said comb; said comb being movable under newly molded ejected articles to temporarily support said articles; said tray being movable over the surface of said comb to push said articles off said comb and out of said molding apparatus simultaneously with the transporting of fresh molding material to said molding surfaces.

8. Molding apparatus comprising a lower platen having molding cavities therein; an upper reciprocable platen having molding surfaces thereon cooperable with said molding cavities; cam track means connected to said reciprocable upper mold; a combination feed-transporting and molded article discharging tray; said tray including a plurality of molding-material chambers having movable bottom portions to allow discharge of said material therefrom; cam follower means on said tray cooperating with said cam track means to cause said tray to be inserted between said platens as the latter open and to be retracted from between said platens as the latter close; a comb disposed beneath said tray on the same side of said apparatus as said tray and reciprocable independently thereof between said platens; said comb being movable under newly molded ejected articles; said tray being movable over the surface of said comb to push said articles off said comb and out of said molding apparatus simultaneously with the transporting of fresh molding material to said molding surfaces; and said comb being operably engaged with said bottom portions to move said portions and cause discharge of said molding material into said cavities as the comb is retracted from between said platens.

9. Molding apparatus comprising: a lower die plate having mold cavities in the upper surface thereof; an upper die plate reciprocable vertically with respect to said lower die plate and having molding surfaces cooperating with said lower die plate cavities; power motor means to reciprocate said upper die plate toward and away from said lower die plate; a diagonal cam track means secured to said upper die plate; a generally horizontally-positioned, horizontally-reciprocable tray means; cam follower means on said tray means cooperable with said cam track means to cause said tray means to be shifted in between said die plates as said upper plate is reciprocated away from said lower plate and to cause said tray means to be shifted out from between said die plates as said upper plate is reciprocated toward said lower plate; a stationary guide track on opposite sides of said apparatus for said tray means; ejection pin means in said lower plate cavities to eject molded articles upwardly therefrom as said upper plate is reciprocated away from said lower plate; comb means positioned generally beneath said tray on the same side of said apparatus as said tray to support articles ejected by said pins; power motor means for said comb means mounted on said guide to move said comb between and out from between said platens independently of said tray movements; said tray having a plurality of molding material receiving chambers therein; trap door means under said chambers; said tray means also comprising a bumper means to push molded articles supported on said comb out of said apparatus; and said comb being capable of moving said trap door means upon its retraction from between said platen to cause discharge of said molding material into said cavities.

References Cited in the file of this patent
UNITED STATES PATENTS

| | | |
|---|---|---|
| 2,208,054 | Reed | July 16, 1940 |
| 2,582,891 | Strauss | Jan. 15, 1952 |